(12) United States Patent
Moon et al.

(10) Patent No.: US 9,795,926 B2
(45) Date of Patent: Oct. 24, 2017

(54) AERATION UNIT AND FILTERING APPARATUS COMPRISING THE SAME

(75) Inventors: Heewan Moon, Seoul (KR); Ji-hyun Jung, Yongin-si (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 339 days.

(21) Appl. No.: 14/348,191

(22) PCT Filed: Aug. 14, 2012

(86) PCT No.: PCT/KR2012/006461
§ 371 (c)(1),
(2), (4) Date: Jul. 10, 2014

(87) PCT Pub. No.: WO2013/048005
PCT Pub. Date: Apr. 4, 2013

(65) Prior Publication Data
US 2014/0319037 A1    Oct. 30, 2014

(30) Foreign Application Priority Data

Sep. 30, 2011 (KR) .................. 10-2011-0099702

(51) Int. Cl.
*B01D 65/08* (2006.01)
*B01D 63/02* (2006.01)
(Continued)

(52) U.S. Cl.
CPC ............ *B01D 65/08* (2013.01); *B01D 63/02* (2013.01); *B01D 65/02* (2013.01);
(Continued)

(58) Field of Classification Search
CPC ............ B01D 2313/26; B01D 2315/06; B01D 2321/185; B01F 3/04113;
(Continued)

(56) References Cited

U.S. PATENT DOCUMENTS

| 6,328,886 B1 * | 12/2001 | Miyashita ............... B01D 61/18 |
| | | 210/220 |
| 2003/0001291 A1 * | 1/2003 | Stevens ............... B01F 3/04262 |
| | | 261/77 |

(Continued)

FOREIGN PATENT DOCUMENTS

CN    1761516 A    4/2006
CN    1864824 A    11/2006
(Continued)

OTHER PUBLICATIONS

Korean Intellectual Property Office, Communication dated May 29, 2017, issued in counterpart Korean Application No. 10-2011-0099702.

*Primary Examiner* — Pranav Patel
(74) *Attorney, Agent, or Firm* — Sughrue Mion, PLLC

(57) ABSTRACT

Disclosed is an aeration unit capable of cleaning all the hollow fiber membranes in a filtering apparatus sufficiently and uniformly thereby improving the filtration efficiency and a filtering apparatus comprising the same. An aeration unit of the present invention comprises a plurality of aeration tubes parallel to each other, each of the aeration tubes comprising a first end and a second end opposite the first end; and a first common pipe in fluid communication with the aeration tubes through the first ends of the aeration tubes to provide the aeration tubes with air. The first common pipe is perpendicular to the aeration tubes. The closer to both ends of the first common pipe the aeration tubes are, the more densely the aeration tubes are arranged.

5 Claims, 3 Drawing Sheets

(51) Int. Cl.
*B01D 65/02* (2006.01)
*C02F 1/44* (2006.01)
*B01F 3/04* (2006.01)

(52) U.S. Cl.
CPC ............ *B01F 3/04262* (2013.01); *C02F 1/44* (2013.01); *B01D 2313/26* (2013.01); *B01D 2315/06* (2013.01); *B01D 2321/185* (2013.01); *C02F 2303/16* (2013.01)

(58) Field of Classification Search
CPC .. B01F 2003/04354; B01F 2003/04276; B01F 2003/04283; B01F 2003/04319; B01F 3/04262
See application file for complete search history.

(56) References Cited

U.S. PATENT DOCUMENTS

| | | | | |
|---|---|---|---|---|
| 2003/0001295 | A1* | 1/2003 | Okajima | B01D 61/18 261/124 |
| 2004/0139992 | A1 | 7/2004 | Murkute et al. | |
| 2006/0131234 | A1* | 6/2006 | Zha | B01D 61/18 210/636 |
| 2006/0260998 | A1 | 11/2006 | Suzuki et al. | |
| 2007/0125697 | A1 | 6/2007 | Lee et al. | |
| 2008/0224337 | A1* | 9/2008 | Tharp | B01F 3/04113 261/120 |
| 2009/0051057 | A1* | 2/2009 | Kim | B01D 65/00 261/121.1 |
| 2010/0200481 | A1 | 8/2010 | Nakahara et al. | |
| 2010/0213124 | A1* | 8/2010 | Takabatake | B01D 61/18 210/636 |
| 2010/0224556 | A1 | 9/2010 | Liao et al. | |
| 2012/0097596 | A1* | 4/2012 | Lee | B01D 61/20 210/321.69 |

FOREIGN PATENT DOCUMENTS

| | | | |
|---|---|---|---|
| JP | 08323161 A | | 12/1996 |
| JP | 11-244674 A | | 9/1999 |
| JP | 2003-144864 A | | 5/2003 |
| JP | 2004-121905 A | | 4/2004 |
| KR | 20-0228498 Y1 | | 6/2001 |
| KR | WO2010110580 | * | 9/2010 |
| TW | 200815094 A | | 4/2008 |
| TW | M380164 U | | 5/2010 |

* cited by examiner

AERATION UNIT AND FILTERING APPARATUS COMPRISING THE SAME

TECHNICAL FIELD

The present invention relates to an aeration unit and a filtering apparatus comprising the same, and more particularly, to an aeration unit capable of improving the filtration efficiency of a filtering apparatus by clearing all the hollow fiber membranes of the apparatus sufficiently and uniformly and a filtering apparatus comprising the same.

BACKGROUND ART

Separation methods for water treatment include a heating or phase-change method, a filtration membrane method, and the like. According to the filtration membrane method, it is possible to obtain the water of quality as desired by controlling the size of the fine pores of the filtration membrane, which advantageously improves the reliability of process. Furthermore, since the filtration membrane method does not require a heating process, it can be advantageously used for water treatment using microorganisms that could be adversely affected by heat.

Among the filtration membrane methods is a method using a hollow fiber membrane module in which hollow fiber membranes are disposed in the form of a bundle. Conventionally, the hollow fiber membrane module is widely used in the field of precision filtration such as preparation of sterile water, drinking water, ultrapure water or the like. Recently, however, the application field of the hollow fiber membrane module is extending to sewage/waste water disposal, separation of solids in sewage disposal tank, removal of suspended solids (SS) in industrial waste water, filtration of stream water, filtration of industrial water, filtration of pool water and the like.

The hollow fiber membrane module may be classified into a submerged module and a pressurized module depending on the operation manner thereof.

The submerged module is immersed in a bath containing fluids to be purified. As a negative pressure is applied inside the hollow fiber membrane, only pure fluid is allowed to permeate the membrane and come into the hollow thereof while the contaminants such as impurities or sludge remains outside the membrane. The submerged module is advantageous in that it can decrease the costs for setting up the facilities and for operating thereof since it does not require any facilities for the fluid circulation.

Continuous water treatment by the hollow fiber membranes, however, causes the fouling of the membranes which significantly decreases the water permeation performance of the hollow fiber membranes. Since the membrane fouling materials contaminate the membranes in various ways, it is required to clean the contaminated hollow fiber membranes in various ways corresponding thereto.

Among the various methods for cleaning the hollow fiber membranes is a aeration cleaning method.

Hereinafter, the aeration cleaning method of the related art will be described with reference to the FIGS. 1 and 2.

FIG. 1 schematically shows the cleaning of an unit module according to the cleaning method of the related art, and FIG. 2 is a top view of the filtering apparatus of the related art.

As shown in FIG. 1, the hollow fiber membrane module 10 comprises a pair of headers 11 and hollow fiber membranes therebetween. During the filtration process, each header 11 is disposed in a direction (Z direction) substantially perpendicular to the surface of the water to be processed, and the hollow fiber membranes 12 are disposed in a direction (X direction) substantially parallel to the surface of the water. Both ends of each hollow fiber membrane 12 is respectively potted in the headers 11 through the fixing parts 11b. The filtrate passing through the hollow fiber membranes 12 is delivered to a filtrate storage tank (not shown) through the outlet port 11a.

Below the hollow fiber membrane module 10 is an aeration tube 20. The hollow fiber membranes 12 are cleaned as the bubbles ejected from the aeration holes (H) of the aeration tube 20 raises.

As the filtration process is performed for a long time, the contraction of the hollow fiber membranes 12 occurs thereby causing the ends of the hollow fiber membranes 12 connected to the headers 11 to be broken or causing the separation of the hollow fiber membranes 12 from the headers 11. To solve this kind of problem, both ends of the hollow fiber membrane 12 are generally potted in the pair of headers 11 in such a way that there is slack in the hollow fiber membrane 12.

Due to the slack in the hollow fiber membrane 12, however, during the aeration cleaning process, the raising bubbles and water flow make the hollow fiber membrane have a shape convex toward the upper direction.

The bubbles ejected from the aeration tube 20 through the aeration holes (H) thereof hit the hollow fiber membranes 12 having a shape convex toward the upper direction and, as a result thereof, raise gradually toward the middle portions of the hollow fiber membranes 12.

Consequently, as shown in FIG. 2, while the middle portions of the hollow fiber membranes 12 corresponding to the high bubble density area (HA) can be sufficiently cleaned, the both end portions of the hollow fiber membranes 12 corresponding to the low bubble density area (LA) cannot be sufficiently cleaned, which makes the whole filtration efficiency of the filtering apparatus decreased.

DISCLOSURE

Technical Problem

Therefore, the present invention is directed to an aeration unit and a filtering apparatus comprising the same capable of preventing these limitations and drawbacks of the related art.

An aspect of the present invention is to provide an aeration unit capable of improving the filtration efficiency of a filtering apparatus by clearing all the hollow fiber membranes of the apparatus sufficiently and uniformly.

Another aspect of the present invention is to provide a filtering apparatus of high filtration efficiency all the hollow fiber membranes of which can be sufficiently and uniformly cleaned.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

Technical Solution

In accordance with one aspect of the present invention, there is provided an aeration unit comprising: a plurality of aeration tubes parallel to each other, each of the aeration tubes comprising a first end and a second end opposite the first end; and a first common pipe in fluid communication with the aeration tubes through the first ends of the aeration tubes to provide the aeration tubes with air, wherein the first common pipe is perpendicular to the aeration tubes, and wherein the closer to both ends of the first common pipe the aeration tubes are, the more densely the aeration tubes are arranged.

In accordance with another aspect of the present invention, there is provided a filtering apparatus comprising: a hollow fiber membrane module comprising hollow fiber membranes to be disposed, during a filtration process, parallel to a surface of water to be processed; and an aeration unit below the hollow fiber membrane module, wherein the aeration unit comprises: a plurality of aeration tubes parallel to each other, each of the aeration tubes comprising a first end and a second end opposite the first end; and a first common pipe in fluid communication with the aeration tubes through the first ends of the aeration tubes to provide the aeration tubes with air, wherein the first common pipe is perpendicular to the aeration tubes, and wherein the closer to both ends of the first common pipe the aeration tubes are, the more densely the aeration tubes are arranged.

The general description provided above and the detailed description provided below are provided only for illustration of the present invention and be construed as providing a more detailed description of inventions defined in claims.

Advantageous Effect

According to the present invention, all the hollow fiber membranes of a filtering apparatus can be cleaned both sufficiently and uniformly, and thus the filtration efficiency of the filtering apparatus can be remarkably increased. Further, the filtering apparatus of the present invention can be prepared at relative low cost.

DESCRIPTION OF DRAWINGS

The above and other objects, features and other advantages of the present invention will be more clearly understood from the following detailed description taken in conjunction with the accompanying drawings, in which.

MODE FOR INVENTION

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

Hereinafter, an aeration unit and a filtering apparatus comprising the same according to the embodiments of the present invention will be described in detail with reference to the annexed drawings.

Figure 1:
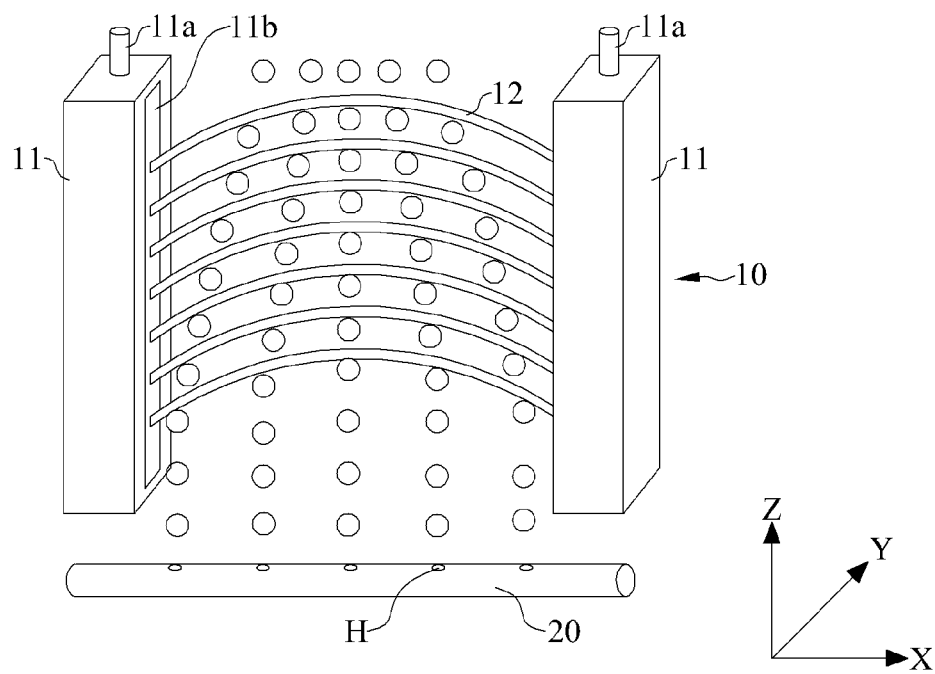
FIG. 1 schematically shows the cleaning of an unit module according to the cleaning method of the related art.
Figure 2:
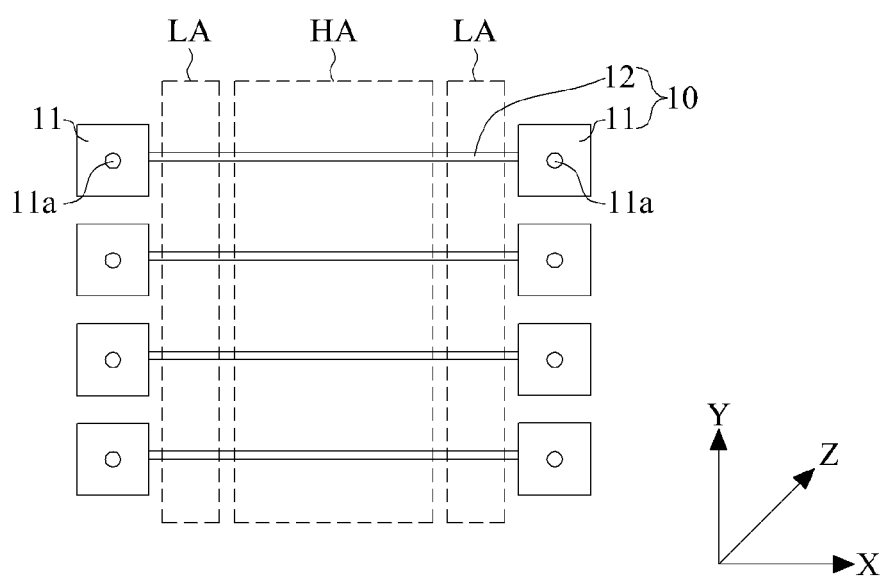
FIG. 2 is a top view of the filtering apparatus of the related art.
Figure 3:
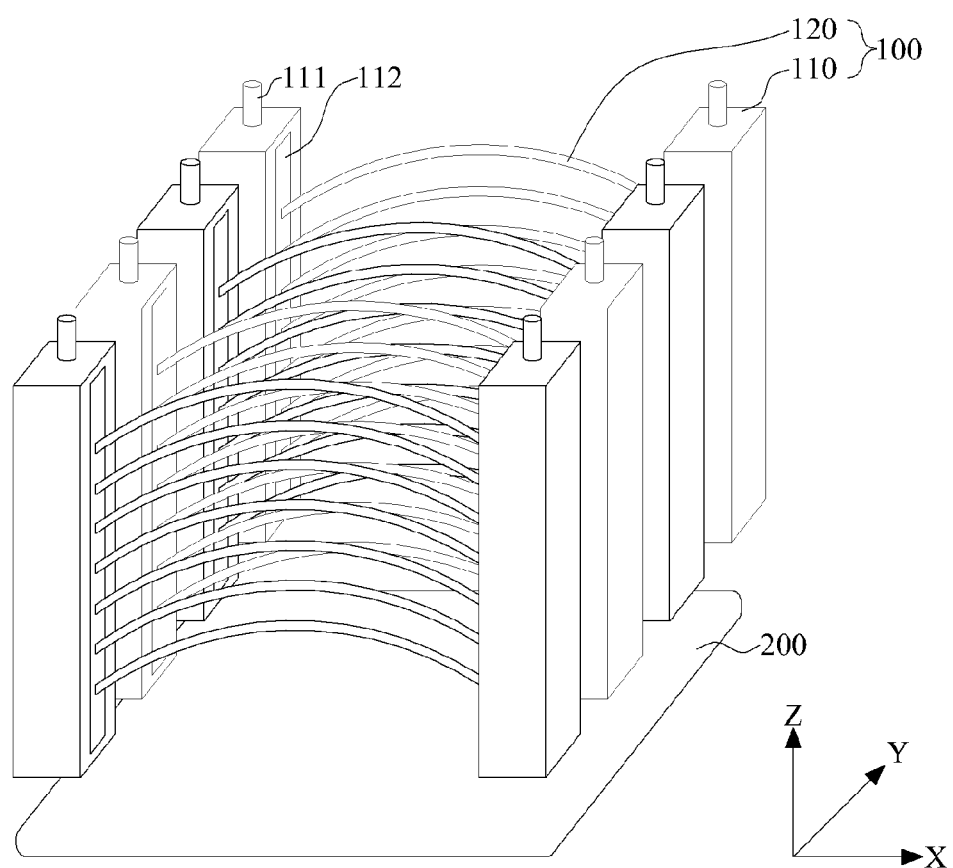
FIG. 3 is a perspective view of the filtering apparatus of the present invention.

FIG. 3 is a perspective view of the filtering apparatus of the present invention.

As illustrated in FIG. 3, a filtering apparatus of the present invention comprises a plurality of hollow fiber membrane modules 100 and an aeration unit 200. The hollow fiber membrane modules 100 are arranged, during a filtration process, in a line (Y direction) parallel to a surface of water to be processed. The aeration unit 200 is positioned below the plurality of The hollow fiber membrane modules 100. The hollow fiber membrane modules 100 and aeration unit 200 of the present invention may be combined to a frame structure (not shown) to form an unit filtering apparatus.

Each of the hollow fiber membrane module 100 comprises a pair of headers 110 and a plurality of hollow fiber membranes 120. Both ends of each hollow fiber membrane 120 are potted into the opposite facing sides of the pair of headers 110 respectively through the fixing parts 112 formed of polyurethane.

The filtering apparatus is submerged into the water to be purified in such a way that the longitudinal direction (Z direction) of the each header 110 is substantially perpendicular to the surface of the water and the longitudinal direction (X direction) of the hollow fiber membranes 120 is substantially parallel to the surface of the water.

To prevent the breakage of the hollow fiber membrane 120 at the ends thereof and/or the separation of the hollow fiber membrane 120 from the headers 110 which may occur due to the contraction of the hollow fiber membrane during the filtration process, both ends of the hollow fiber membrane 120 are potted in the pair of headers 110 in such a way that there is slack in the hollow fiber membrane 120. FIG. 3 illustrates the hollow fiber membranes 120 affected by the bubbles ejected from the aeration unit 200 such that they have shapes convex toward the upper direction There is a collecting space (not shown) inside each header 110 to receive the filtrate passing through the hollow fiber membranes 120. The hollow spaces of the hollow fiber membranes 120 are in fluid communication with the collecting spaces of the headers 110. As a negative pressure is applied to the hollow spaces of the hollow fiber membranes 120, the filtrate passes through the hollow fiber membranes 120, is collected in the collecting spaces of the headers 110, and then delivered to a filtrate storage tank (not shown) through the outlet ports 111 of the headers 110.

The hollow fiber membranes 120 of the hollow fiber membrane modules 100 are cleaned by the bubbles ejected from the aeration unit 200.

Hereinafter, the aeration units according to the embodiments of the present inventions will be described in detail with reference to FIGS. 4 and 5.

Figure 4:
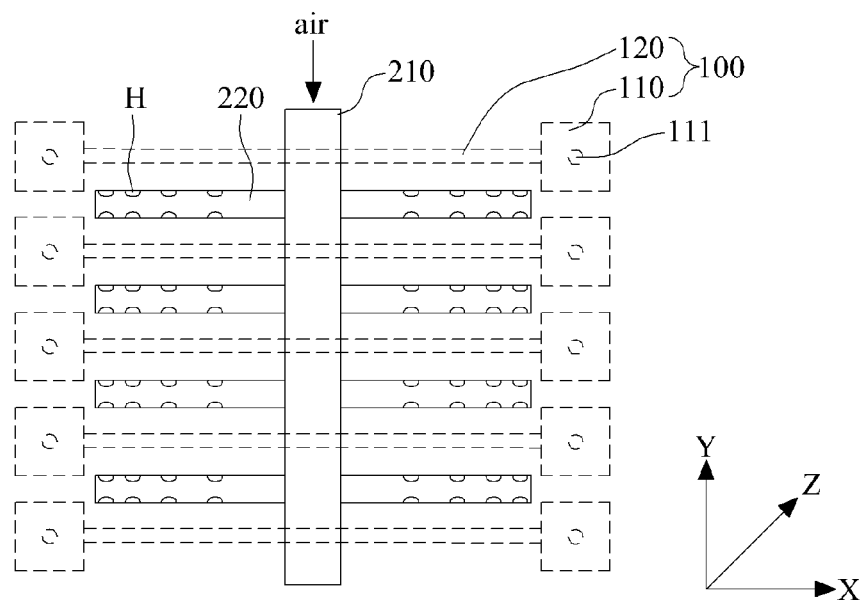
FIG. 4 is a plane view of the aeration unit according to the first embodiment of the present invention.

FIG. 4 is a plane view of the aeration unit according to the first embodiment of the present invention.

As illustrated in FIG. 4, the aeration unit 200 according to the first embodiment of the present invention comprises a common pipe 210 and a plurality of aeration tubes 220.

The common pipe 210 may be a one body-type pipe. Optionally, the common pipe 210 may comprise a plurality of unit pipes connected to each other through cross-connectors.

The aeration tubes 220 are connected to the common pipe 210 through their one ends in such a manner that they are disposed in symmetrical pattern having the common pipe 210 as an axis of symmetry. When a plurality of unit pipes are connected to each other through the cross-connectors to form the common pipe 210, a pair of aeration tubes 220 are respectively connected to each cross-connector.

Above the aeration unit 200 are disposed a plurality of hollow fiber membrane modules 100 (illustrated with dotted line). The longitudinal direction of the hollow fiber membranes 120 is substantially parallel to the longitudinal direction of the aeration tubes 220. The cleaning effect can be maximized by positioning the hollow fiber membranes 120 directly above the aeration tubes 220.

Each aeration tube 220 has a plurality of aeration holes (H) formed along the longitudinal direction thereof. Optionally, as illustrated in FIG. 4, a pair of aeration holes (H) are formed along a direction (Y direction) substantially perpendicular to the longitudinal direction of an aeration tube 220, and a plurality of such pairs of aeration holes (H) are formed along the longitudinal direction (X direction) of an aeration tube 220.

Air from an air supply unit (not shown) passes through the common pipe 210 and is ejected from the aeration tubes 220 through the aeration holes (H) thereof to create the bubbles. The bubbles so created directly hit or vibrate the hollow fiber membranes 120 to clean them, thereby preventing the fouling thereof.

As explained above, during the aeration cleaning process, the hollow fiber membranes 120 get to have a shape convex toward the upper direction (Z direction) due to the raising bubbles and water flow caused by them. The bubbles ejected from the aeration tube 220 through the aeration holes (H) thereof hit the hollow fiber membranes 120 and, as a result thereof, raise gradually toward the middle portions of the hollow fiber membranes 120. Consequently, the relatively higher the hollow fiber membrane 120 is located (i.e., the closer to the surface of the water the hollow fiber membrane 120 is located), the less amount of the bubbles are supplied to both end parts thereof.

To solve such problem, the aeration tubes 220 according to the first embodiment of the present invention have more aeration holes (H) at the portions corresponding to both end parts of the hollow fiber membrane 120 than at the portions corresponding to the middle part of the hollow fiber membrane 120. In other words, the farther from the one end of the aeration tube 220 through which the aeration tube 220 is connected to the common pipe 210 and the closer to the other opposite end the aeration holes (H) are, the more densely the aeration holes (H) are formed. The aeration tube 220 has no aeration hole at the predetermined area from its one end through which the aeration tube 220 is connected to the common pipe 210.

Thus, according to the first embodiment of the present invention, the probability that the bubbles will be supplied to both end parts of the hollow fiber membrane 120 can be increased, and thus the bubbles can be uniformly supplied to the whole hollow fiber membrane 120.

However, the aeration unit 200 of the first embodiment of the present invention has some drawbacks as below.

First, since each aeration tube 220 is connected to the common pipe 210 only through its one end, it is difficult to maintain the aeration tubes 220 in a horizontal position during the aeration cleaning process. If the horizontal position of the aeration tubes 220 is broken even slightly, the bubbles cannot be supplied to the hollow fiber membranes 120 uniformly.

Second, since the aeration tube 220 has no aeration hole at the predetermined area from its one end through which the aeration tube 220 is connected to the common pipe 210, the predetermined area of the aeration tube 220 only functions as a path for air and cannot directly contribute to the aeration cleaning. The more the portion which cannot directly contribute to the aeration cleaning the aeration tube 210 has, the more the economic loss or waste occurs.

Hereinafter, described in detail will be the second embodiment of the present invention which can overcome the aforementioned problems of the first embodiment.

Figure 5:
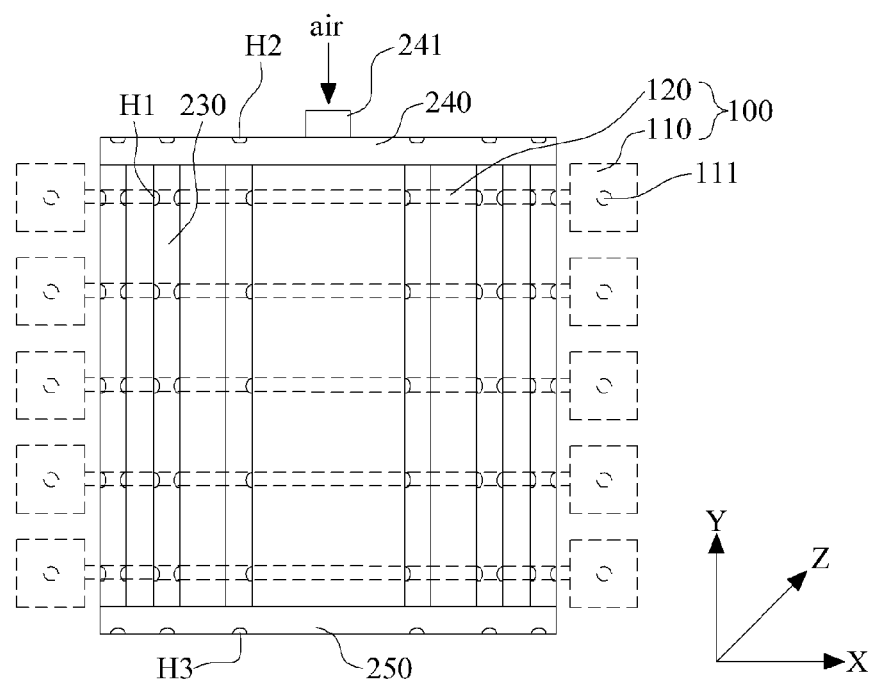
FIG. 5 is a plane view of the aeration unit according to second embodiment of the present invention.

FIG. 5 is a plane view of the aeration unit according to second embodiment of the present invention.

As illustrated in FIG. 5, the aeration unit 200 of the second embodiment of the present invention comprises a first common pipe 240 and a plurality of aeration tubes 230 disposed parallel to each other.

The first common pipe 240 provides the aeration tubes 230 with air and has an inlet port 241 to receive the air from air supply unit (not shown).

Each of the aeration tubes 230 comprises a first end and a second end opposite to the first end. Each aeration tube 230 has a plurality of aeration holes (H1) formed at equal intervals along the longitudinal direction (Y direction) thereof. Optionally, as illustrated in FIG. 5, a pair of aeration holes (H1) are formed along a direction (X direction) substantially perpendicular to the longitudinal direction of the aeration tube 230, and a plurality of such pairs of aeration holes (H1) are formed at equal intervals along the longitudinal direction (Y direction) of the aeration tube 230.

Since the aeration tube 230 of the second embodiment of the present invention has the aeration holes (H1) formed at equal intervals, unlike the first embodiment, there is not a portion in the aeration tube 230 which causes the economic loss or waste and the whole parts of the aeration tube 230 can perform the aeration cleaning function equivalently.

Above the aeration unit 200 are disposed a plurality of hollow fiber membrane modules 100 (illustrated with dotted line). The longitudinal direction of the hollow fiber membranes 120 is substantially perpendicular to the longitudinal direction of the aeration tubes 230. The cleaning effect can be maximized by positioning the hollow fiber membranes 120 directly above the aeration holes (H1) of the aeration tubes 230.

Each of the aeration tubes 230 is in fluid communication with the first common pipe 240 through the first end thereof to receive the air for aeration cleaning from the first common pipe 240. The first common pipe 240 is perpendicular to the aeration tubes 230.

The air from an air supply unit (not shown) passes through the common pipe 240 and is ejected from the aeration tubes 230 through the aeration holes (H1) thereof to create the bubbles. The bubbles so created directly hit the hollow fiber membranes 120 or vibrate the hollow fiber membrane modules 100 to clean them, thereby preventing the fouling thereof.

As explained above, during the aeration cleaning process, the hollow fiber membranes 120 get to have a shape convex toward the upper direction (Z direction) due to the raising bubbles and water flow caused by them. The bubbles ejected from the aeration tube 230 through the aeration holes (H1) thereof hit the hollow fiber membranes 120 and, as a result thereof, raise gradually toward the middle portions of the hollow fiber membranes 120. Consequently, the relatively higher the hollow fiber membrane 120 is located (i.e., the closer to the surface of the water the hollow fiber membrane 120 is located), the less amount of the bubbles are supplied to both end parts thereof.

To solve such problem, according to the second embodiment of the present invention, the closer to both ends of the first common pipe 240 the aeration tubes 230 are, the more densely the aeration tubes 230 are arranged. That is, the number of the aeration tubes 230 corresponding to the end parts of the hollow fiber membranes 120 is larger than that of the aeration tubes 230 corresponding to the middle parts of the hollow fiber membranes 120.

Optionally, as illustrated in FIG. 5, there may be no aeration tube corresponding to the middle parts of the hollow fiber membranes 120. In other words, the middle part of the first common pipe 240 is not connected to any of the aeration tubes 230. In detail, the first common pipe 240 is not connected to the aeration tubes 230 at a predetermined area from its very middle.

Thus, according to the second embodiment of the present invention, the probability that the bubbles will be supplied to both end parts of the hollow fiber membrane 120 can be increased, and thus the bubbles can be uniformly supplied to the whole hollow fiber membrane 120. The uniform supply of the bubbles to the whole hollow fiber membrane 120 can improve both the cleaning efficiency and the filtration efficiency of the filtering apparatus at the same time.

As shown in FIG. 5, the aeration unit 200 of the second embodiment of the present invention further comprises a second common pipe 250. Each of the aeration tubes 230 is in fluid communication with the second common pipe 250 through the second end thereof. The first and second common pipes 240 and 250 are parallel to each other.

Consequently, since the aeration unit 200 of the second embodiment of the present invention has a structure in which each aeration tube 230 is connected to the first and second common pipes 240 and 250 through its first and second ends respectively, it is relatively easy to maintain the aeration tubes 230 in a horizontal position during the aeration cleaning process. The aeration tubes 230 maintained in a horizontal position can supply the bubbles uniformly to the hollow fiber membranes 120.

Optionally, to minimize the probability that the horizontal position of the aeration tubes 230 will be broken, a certain part of the aeration unit 200 may be combined to a frame (not shown) into which the hollow fiber membrane modules 100 are supposed to be installed.

As illustrated in FIG. 5, the first common pipe 240 may have a plurality of aeration holes (H2). Further, the second common pipe 250 may also have a plurality of aeration holes (H3). The ejection of the bubbles from the first and second common pipes 240 and 250 through their aeration holes (H2, H3) facilitates more effective cleaning of the hollow fiber membranes of the first and last modules among the hollow fiber membrane modules 100 arranged in a line along the longitudinal direction (Y direction) of the aeration tubes 230.

Optionally, to supply the bubbles uniformly, it is possible for the first common pipe 240 to have no aeration holes at a predetermined area from its very middle. For the same reason, it is also possible for the second common pipe 250 to have no aeration holes at a predetermined area from its very middle.

The invention claimed is:

1. A filtering apparatus comprising:
a hollow fiber membrane module comprising hollow fiber membranes to be disposed, during a filtration process, parallel to a surface of water to be processed; and
an aeration unit below the hollow fiber membrane module,
wherein the aeration unit comprises:
a plurality of aeration tubes which are disposed parallel to each other with a distance, wherein each of the plurality of aeration tubes comprises a first end and a second end opposite the first end; and
a first common pipe having an inlet to receive air, a first end, and a second end opposite the first end, wherein the first common pipe is in fluid communication with the plurality of aeration tubes through the first end of the plurality of aeration tubes to provide the plurality of aeration tubes with the air,
wherein the first common pipe is perpendicular to the plurality of aeration tubes and parallel to the hollow fiber membranes, and
wherein the distance between the plurality of aeration tubes increases toward a middle of the first common pipe.

2. The filtering apparatus of claim 1, wherein none of the plurality of aeration tubes is connected to the middle of the first common pipe.

3. The filtering apparatus of claim 1, wherein the aeration unit further comprises a second common pipe in fluid communication with the plurality of aeration tubes through the second ends thereof.

4. The filtering apparatus of claim 3, wherein the first and second common pipes are parallel to each other.

5. The filtering apparatus of claim 3, wherein the first and second common pipes have aeration holes respectively.

* * * * *